United States Patent [19]

McQuinn et al.

[11] Patent Number: 4,782,524
[45] Date of Patent: Nov. 1, 1988

[54] TELEPHONE HEADSET INTERFACE CIRCUIT

[75] Inventors: Jeffrey R. McQuinn, Bolingbrook; Robert Anderson, Lisle, both of Ill.

[73] Assignee: Rockwell International Corporation, El Segundo, Calif.

[21] Appl. No.: 47,079

[22] Filed: May 5, 1987

[51] Int. Cl.4 .......................... H04M 1/19; H04M 1/60
[52] U.S. Cl. ..................................... 379/395; 379/387; 379/400; 379/413; 379/414
[58] Field of Search ............... 379/387, 399, 400, 402, 379/409, 413, 414, 430, 433, 391, 394, 395; 381/183, 187

[56] References Cited

U.S. PATENT DOCUMENTS 4,536,888 8/1985 Wilson ........................... 379/414 X Primary Examiner—Eugene R. LaRoche
Assistant Examiner—Steven J. Mottola
Attorney, Agent, or Firm—C. B. Patti; V. L. Sewell; H. F. Hamann

[57] ABSTRACT

An interface circuit interfaces a four wire telephone circuit to a telephone headset. An adjustable receiver portion of the interface circuit receives a line input signal from the four wire circuit and produces a headset input signal limited to a predetermined signal level. An adjustable output portion of the interface circuit accepts a headset output signal and conditions it for use as a line output signal on the four wire circuit. A DC voltage is also supplied to a headset microphone through the output portion of the interface circuit.

19 Claims, 3 Drawing Sheets

TELEPHONE HEADSET INTERFACE CIRCUIT

BACKGROUND OF THE INVENTION

The present invention relates generally to circuits for interfacing telephone equipment to a four wire telephone line and, in particular, to a circuit which supplies a DC bias and optional sidetone to a telephone headset and in addition provides signal conditioning between the headset and the four wire line.

In present day telephone systems, it is often desirable for an operator using a telephone headset to be able to connect directly into a four wire telephone line. However, certain problems exist which may form a danger to the operator as well as cause poor operation of the headset. For example, signal levels on a telephone line can range from +16.0 dbm to −7.0 dbm. Furthermore, it is possible that large signal levels can momentarily occur on the telephone line. Ear damage to an operator may occur when signal levels on the telephone line are greater than −15 dbv, which may be applied to the headset. A −22 dbv tone is considered to be annoying. Normal speech levels are at approximately −41 dbv for good operation of the headset. Therefore, proper signal conditioning is needed for acceptable operation of the headset, as well as, providing for the safety of the operator.

In addition, it is desirable that a predetermined bias voltage be available for the microphone in the headset. In terms of cost of manufacturing there is a need to provide the DC biasing voltage with a minimum of circuitry.

The present invention provides solutions to these problems in the prior art.

SUMMARY OF THE INVENTION

It is an objective of the present invention to provide a headset interface circuit which provides a bias current for a microphone in the headset and also to provide proper signal conditioning for the telephone line. It is a feature of the present invention that the novel interface circuit can be utilized with a standard four wire, 600 ohm telephone line. An advantage of the present invention is that the interface circuit can be utilized with other types of telephone equipment besides headsets.

The interface circuit has a receiver circuitry which accepts a line input signal from a four wire telephone circuit to produce a received signal. The received signal is then applied to an input of an inverter to produce a normalized signal. The inverter has an adjustable gain. The normalized signal is sent through a clipping circuit in order to limit the maximum level of the signal. This signal is then sent through an amplifier which has a predetermined value of loss to produce a headset input signal for the telephone headset. This headset input signal is connected to the earphones in the headset.

A signal from the microphone of the headset is a headset output signal which is accepted by the interface circuit to produce a headset received signal. This headset received signal is then sent through a conditioning circuit, which also has an adjustable gain, to produce a conditioned signal. A transmitting circuit uses the conditioned signal to output a line output signal on the four wire telephone circuit.

The interface circuit also provides a DC voltage which is supplied to the headset. The DC voltage is connected to the headset through the circuit for accepting the headset output signal. Also, the interface circuit may have a side tone connection between an input of the amplifier producing the headset input signal and the output of the accepting circuit.

BRIEF DESCRIPTION OF THE DRAWINGS

The features of the present invention which are believed to be novel, are set forth with particularity in the appended claims. The invention, together with further objects and advantages, may best be understood by reference to the following description, taken in conjunction with the accompanying drawings, in the several figures of which like reference numerals identify like elements, and in which:

DESCRIPTION OF THE PREFERRED EMBODIMENT

The present invention has general applicability but is most advantageously utilized for interfacing a telephone headset with a four wire telephone line. It is to be understood, however, that the interface circuit of the present invention may be used for other types of telephone equipment than headsets.

Figure 1:
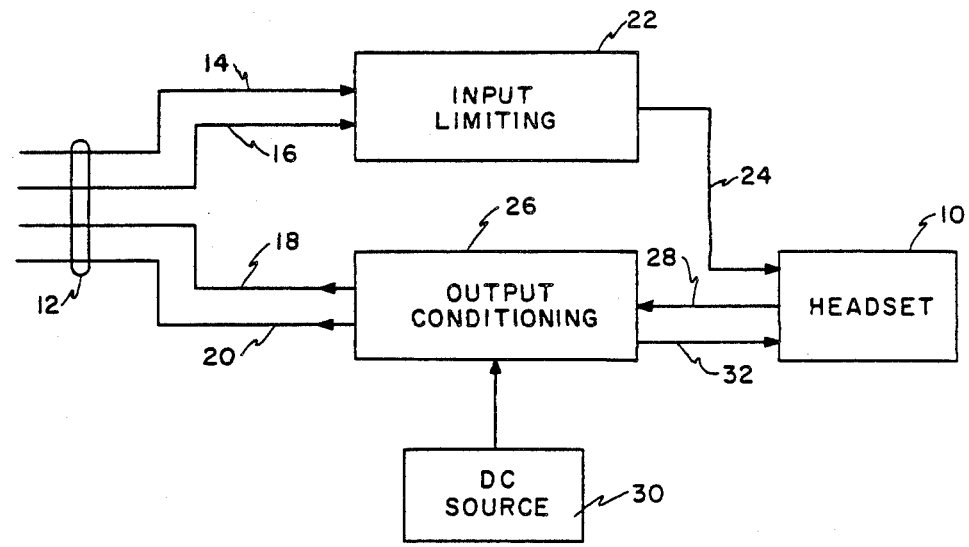
FIG. 1 is a general block diagram of an interface circuit embodying the present invention.

FIG. 1 is a general block diagram of the novel interface circuit. In the preferred embodiment, this circuit interfaces a telephone headset 10 to a four wire telephone line 12. The four wire telephone line has two receive wires 14 and 16 and two transmit wires 18 and 20. An input limiting circuit 22 receives a line input signal on the telephone input lines 14 and 16. The input limiting circuit conditions the input signal, which may range from +16 dbm to −7 dbm and produces a headset input signal which is at a level of approximately −20 db on line 24 which connects the input limiting circuit 22 to the headset 10.

An output conditioning circuit 26 receives a headset output signal on line 28 and conditions the signal so that the proper interface to the telephone transmit lines 18 and 20 is effected. Also, a DC bias voltage for the headset 10 is provided by DC source 30 via the output conditioning circuit 26. The DC bias is provided on line 32 to the headset 10. However, as will be explained, the DC bias actually utilizes line 32 and line 28.

Figure 2:
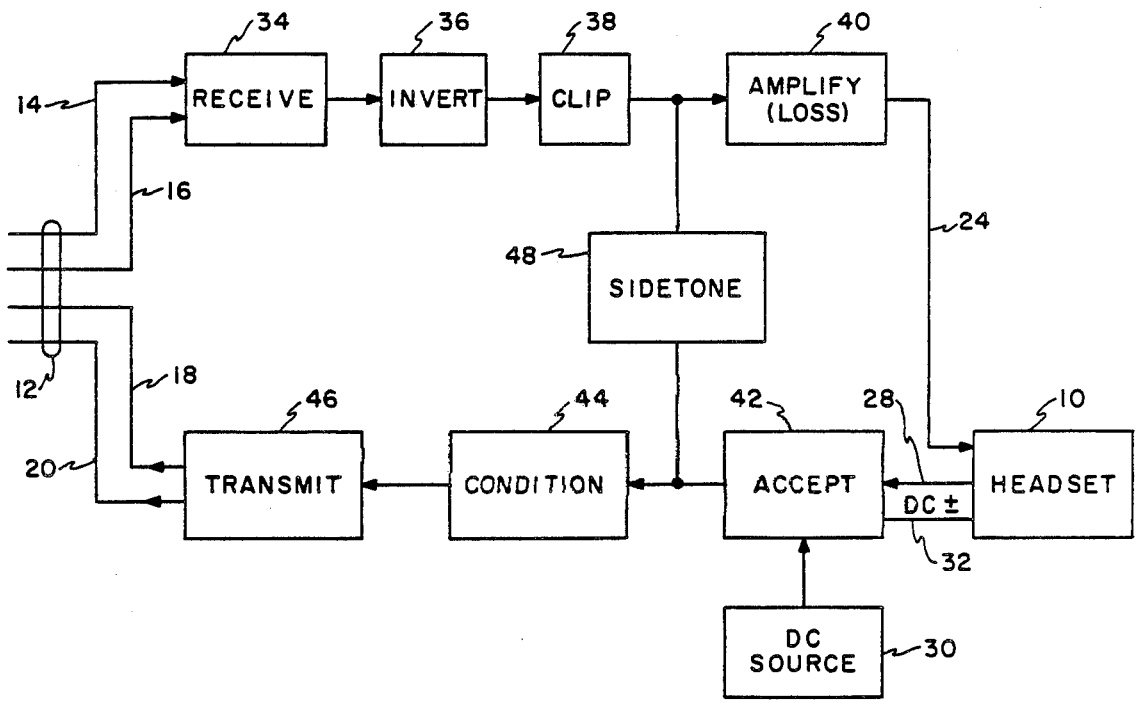
FIG. 2 is a more detailed block diagram of the FIG. 1 block diagram.

Referring now to FIG. 2, a more detailed block diagram of the interface circuit is depicted. A receiver circuit 34 receives the line input signal appearing on lines 14 and 16 of the four wire telephone line 12. The receiver circuit provides the proper impedance matching to the 600 ohm receiving lines 14 and 16. The receiver circuit 34 produces a received signal which is inverted by inverter 36 which has an adjustable gain to produce a normalized signal. Clipping circuit 38 insures that the normalized signal cannot exceed a predetermined level and produces a limited signal. Amplifier 40 has a predetermined value of loss and processes the limited signal to produce a headset input signal on line 24. An accepting circuit receives the headset output signal on line 28 and produces the headset received signal which is conditioned by conditioning circuit 44. The conditioning circuit 44 has an adjustable gain to produce a properly signal which is applied to the transmitting circuit 46 which interfaces with lines 18 and 20 of the four wire telephone line 12. The transmitting circuit 46 provides the proper impedance matching for the 600 transmitting lines 18 and 20.

The interface circuit also provides for side tone in block 48 which is connected between the input of the amplifier 40 and the output of the accepting circuit 42.

Figure 3:
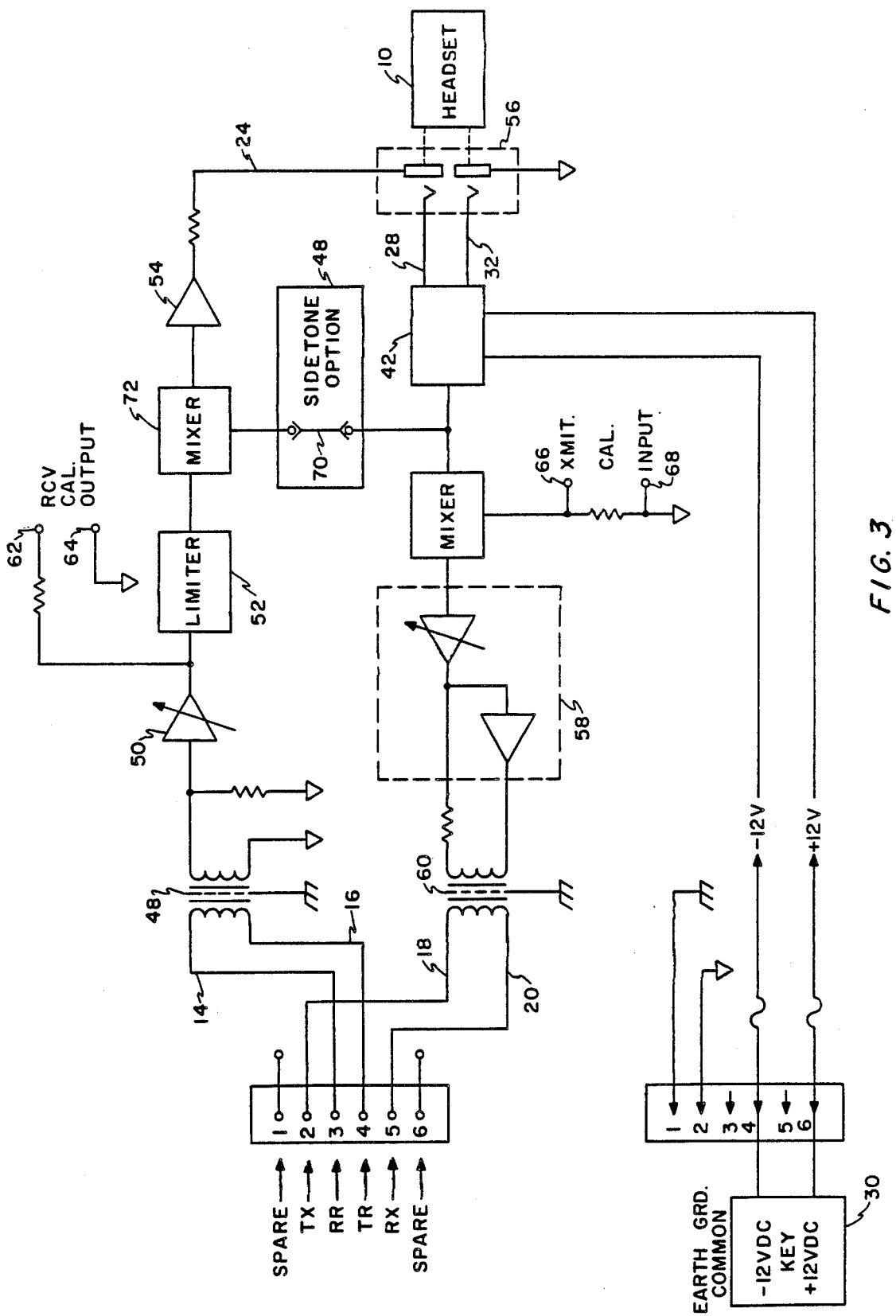
FIG. 3 is a simplified circuit schematic of the FIG. 1 interface circuit.

FIG. 3 shows a simplified schematic diagram of the interface circuit. The line input signal on lines 14 and 16 is transformer coupled through transformer 48 with a 600 ohm reflected impedance into inverter 50. The gain control of the inverter 50 allows line input signals from +7 dbm to −16 dbm at about 300 to 3800 Hz to be normalized to 0 dbm at the output of the inverter 50. This normalized signal is fed into a clipping circuit or limiter 52 which prevents signals greater than 0 dbm from being fed into the earphone drive amplifier 54. The earphone drive amplifier 54 provides 20 db of loss and outputs the signal to the headset 10. The headset 10 is connected to the interface circuit with a dual two-wire phone jack which is received in the proper mating plug 56 as shown in FIG. 3.

A DC bias supply 30 is shown in FIG. 3 supplying + and −12 volts DC. This + and −12 volts DC is fed through the accepting circuit 42 and is applied to the headset with the positive 12 volts appearing on line 28 and the negative 12 volts appearing on line 32. As was previously explained, line 28 also functions as the line on which the headset output signal appears. Signals received from the headset are coupled into a push/pull amplifier 58 which has an adjustable gain. The amplifier 58 is transformer coupled by transformer 60 to the transmit lines 18 and 20. The amplifier 58 conditions the headset received signal for transmission on lines 18 and 20 in the range +7 dbm to −16 dbm with 0 dbm at about 300–3800 Hertz appearing on the input to the amplifier 58. The input of the amplifier 58 which is at 0 dbm, and also the output of inverter 50 which is at 0 dbm are the points in the circuit which are used for calibrating. Terminals 62 and 64 can be utilized to calibrate the receiver side of the interface circuit and terminals 66 and 68 can be used to calibrate the transmit side of the interface circuit.

A set level of side tone will be fed from the microphone input circuitry to the earphone driver circuit. The side tone, shown as block 48 in FIG. 3, can be disabled by removing an option strap 70. The side tone option 48 is connected to the input of amplifier 54 through mixer 72 and is connected to the output of acceptance circuit 42.

Figure 4:
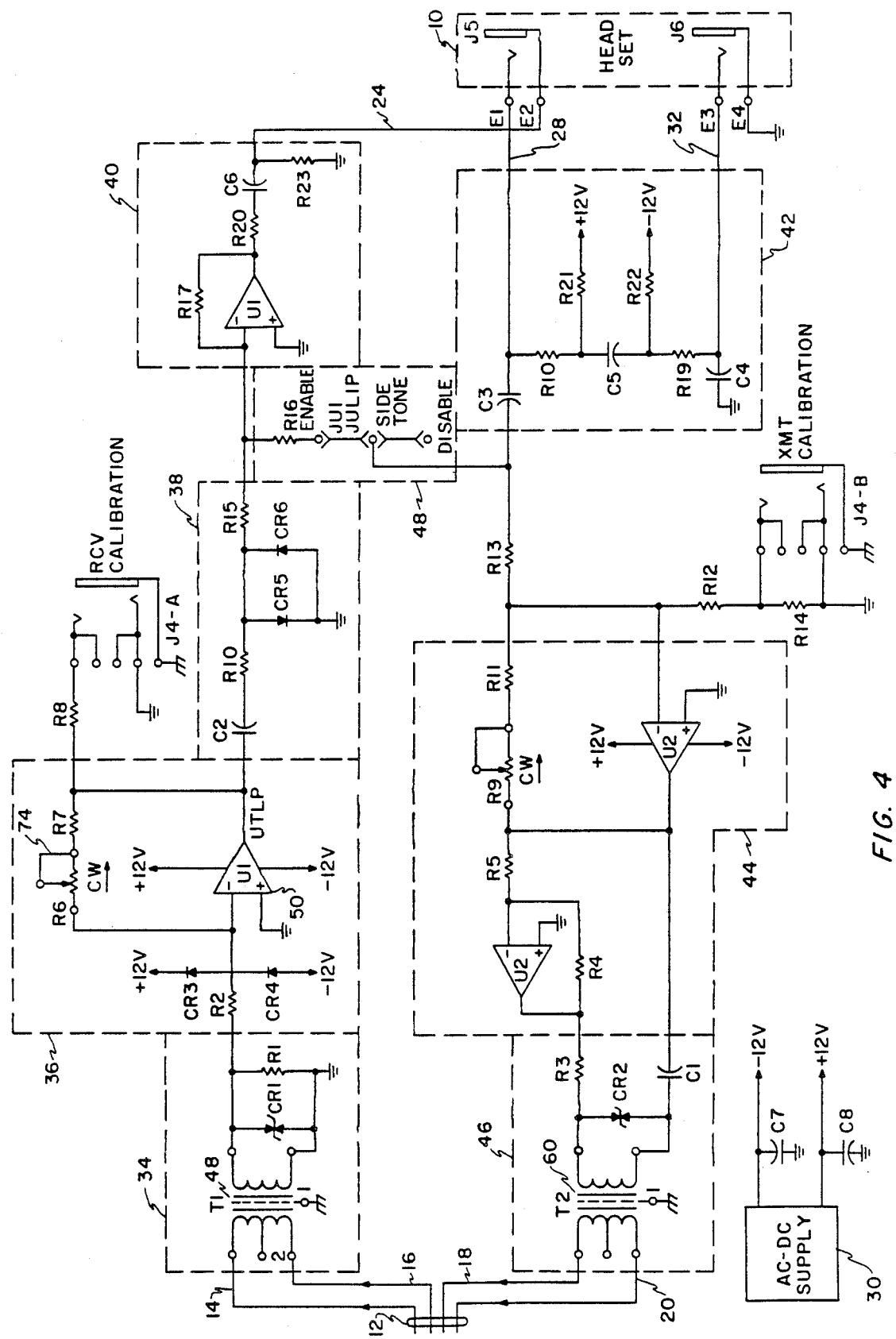
FIG. 4 is a detailed circuit schematic of the FIG. 1 interface circuit.

FIG. 4 shows a preferred embodiment of the present invention. Receiver circuit 34 is connected to input lines 14 and 16 and has transformer 48 with associated circuitry for providing the proper reflected impedance to the 600 ohm input line 14 and 16. The inverting circuit 36 has inverter 50 which has an adjustable gain controlled by potentiometer 74 and associated circuitry. The limiting function of the clipping circuit 38 is effected by diodes CR5 and CR6. Amplifier 40 produces the 20 db of loss for the headset input signal which appears on line 24. The accepting circuit 42 receives the headset output signal on line 28 and outputs the headset received signal. As shown, line 28 also is connected via resistors R10 and R21 to the positive 12 volts from the DC source 30 and line 32 is connected via resistors R19 and R22 to the negative 12 volts from the source 30. Thus, the accepting circuit 42 functions both to supply the DC bias to the headset 10 as well as receiving the microphone signal from the headset 10. The output of the acceptance circuit 42 is applied to the conditioning circuit 44 as is shown in FIG. 4. After the signal has been properly conditioned, it is sent to transmitting circuit 46 wherein transformer 60 with its associated circuitry applies the proper impedance matching to the transmit lines 18 and 20.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. An interface circuit for interfacing a four wire telephone circuit to a telephone headset, comprising:
   means for receiving said line input signal on the four wire telephone circuit to produce a received signal;
   means for inverting said received signal and having an adjustable gain to produce a normalized signal;
   means for clipping said normalized signal to produce a limited signal;
   means for amplifying said limited signal and having a predetermined value of loss to produce a headset input signal for the telephone headset;
   adjustable means for outputting 9 line output signal to the four wire circuit and receiving a headset output signal from the headset; and
   means for providing a predetermined DC voltage to be used by the headset and connected to said means for outputting.

2. The interface circuit described in claim 1, wherein said adjustable means for outputting comprises:
   means for accepting said headset output signal from said telephone headset to produce a headset received signal;
   means for conditioning said headset received signal and having an adjustable gain to produce a conditioned signal; and
   means for transmitting said condition signal as a line output signal on the four wire telephone circuit.

3. An interface circuit for interfacing a four wire telephone circuit to a telephone headset, comprising:
   means for receiving a line input signal on the four wire telephone circuit to produce a received signal;
   means for inverting said received signal and having an adjustable gain to produce a normalized signal;
   means for clipping said normalized signal to produce a limited signal;
   means for amplifying said limited signal and having a predetermined value of loss to produce a headset input signal for the telephone headset;
   means for accepting a headset output signal from said telephone headset to produce a headset received signal;
   means for conditioning said headset received signal and having an adjustable gain to produce a conditioned signal; and
   means for transmitting said conditioned signal as a line output signal on the four wire telephone circuit.

4. The interface circuit described in claim 3, wherein said interface circuit further comprises means for providing a side tone connected between an input of said means for amplifying and an output of said means for accepting.

5. The interface circuit described in claim 3, wherein said interface circuit further comprises means for supplying a predetermined DC voltage to the headset and connected to said means for accepting.

6. The interface circuit described in claim 5, wherein said headset input signal appears on a first terminal, said headset output signal and one polarity of said DC voltage appears on a second terminal, an opposite polarity of said DC voltage appears on a third terminal and a fourth terminal is connected to ground.

7. The interface circuit described in claim 3, wherein said line input signal is in the range +7.0 dbm to −16.0 dbm at about 300 to 3800 Hz and said normalized signal is approximately 0.0 dbm.

8. The interface circuit described in claim 3, wherein said means for amplifying has a predetermined loss of approximately 20.0 db.

9. The interface circuit described in claim 3, wherein said means for conditioning can be adjusted to produce a line output signal in the range +7.0 dbm to −16.0 dbm at about 300 to 3800 Hz and said headset received signal is approximately 0.0 dbm.

10. The interface circuit described in claim 3, wherein said means for receiving has at least a transformer for reflecting a predetermined impedance to the four wire circuit.

11. The interface circuit described in claim 3, wherein said means for transmitting has at least a transformer for reflecting a predetermined impedance to the four wire circuit.

12. The interface circuit described in claim 3, wherein said means for conditioning has at least a push/pull amplifier.

13. The interface circuit described in claim 3, wherein said means for providing a DC voltage is connected to an AC to DC voltage converter, or other +DC and −DC power source.

14. An interface circuit for interfacing a four wire telephone circuit to a telephone headset, comprising:
receiver circuit for receiving a line input signal in the range +7.0 dbm to −16.0 dbm at about 300 to 3800 Hz on the four wire telephone circuit, said receiver circuit producing a received signal;
inverter circuit for inverting said received signal and having an adjustable gain to produce a normalized signal which is approximately 0.0 dbm;
clipping circuit for limiting said normalized circuit to produce a limited signal;
amplifier having a predetermined value loss of approximately 20.0 db for amplifying said limited signal to produce a headset input signal for the telephone headset;
accepting circuit for receiving a headset output signal from said telephone headset to produce a headset received signal;
conditioning circuit having an adjustable gain for conditioning said headset received signal to produce a conditioned signal, said headset received signal being approximately 0.0 dbm;
transmitter circuit for transmitting said condition signal as a line output signal in the range +7.0 dbm to −16.0 dbm at about 300 to 3800 Hz on the four wire telephone circuit;
DC voltage supply for supplying a predetermined DC voltage to the headset and connected to said accepting circuit; and
said headset input signal appearing on a first terminal, said headset output signal and one polarity of said DC voltage appearing on a second terminal, an opposite polarity of said DC voltage appearing on the third terminal and a fourth terminal connected to ground.

15. The interface circuit described in claim 14, wherein said interface circuit further comprises means for providing a side tone connected between an input of said amplifier and an output of said accepting circuit.

16. The interface circuit described in claim 14, wherein said receiving circuit has at least a transformer for reflecting a predetermined impedance to the four wire circuit, said transmitting circuit also has at least a transformer for reflecting a predetermined impedance to the four wire circuit, and said conditioning circuit has at least a push/pull amplifier.

17. A method of interfacing a four wire telephone circuit to a telephone headset, comprising:
receiving a line input signal on the four wire telephone circuit to produce a received signal;
inverting said received signal with an adjustable gain to produce a normalized signal;
clipping said normalized signal to produce a limited signal;
amplifying said limited signal with a predetermined value of loss to produce a headset input signal for the telephone headset;
accepting a headset output signal form the telephone headset to produce a headset received signal;
conditioning said headset received signal with an adjustable gain to produce a conditioned signal; and
transmitting said conditioned signal as a line output signal on the four wire telephone circuit.

18. The method described in claim 17, wherein said method further comprises supplying a predetermined DC voltage to the headset, at least one polarity of said DC voltage appearing on a terminal which also receives said headset output signal.

19. The method described in claim 17, wherein said method further comprises providing a side tone connection between an amplifier in a receiver portion of the interface circuit and an output of an accepting circuit in a transmitting portion of said interface circuit.

* * * * *